United States Patent [19]

Schwabe

[11] Patent Number: 4,977,027

[45] Date of Patent: Dec. 11, 1990

[54] STOPPERS FOR INJECTION AND INFUSION BOTTLES COATED WITH PLASTICS HAVING POLAR MOLECULAR GROUPS

[75] Inventor: Karl D. Schwabe, Frankfurt am Main, Fed. Rep. of Germany

[73] Assignee: Hoechst Aktiengesellschaft, Frankfurt am Main, Fed. Rep. of Germany

[21] Appl. No.: 234,116

[22] Filed: Aug. 17, 1988

[30] Foreign Application Priority Data

Aug. 19, 1987 [DE] Fed. Rep. of Germany ....... 3727626

[51] Int. Cl.[5] ........................ B32B 27/30; B65D 39/00

[52] U.S. Cl. ................................ 428/423.9; 428/480; 428/496; 428/500; 428/508; 428/510; 428/522; 424/85.8; 215/364; 220/307; 220/DIG. 19

[58] Field of Search ........... 428/500, 496, 522, 423.9, 428/480, 508, 510

[56] References Cited

U.S. PATENT DOCUMENTS 3,993,751 11/1976 Zincke ................................ 424/682
4,321,306 3/1982 Eguchi ................................ 428/421

FOREIGN PATENT DOCUMENTS

3346351A1 7/1985 Fed. Rep. of Germany .

OTHER PUBLICATIONS

English Language Abstract of DE 3,346,351 A1.

*Primary Examiner*—P. C. Sluby
*Attorney, Agent, or Firm*—Finnegan, Henderson, Farabow, Garrett and Dunner

[57] ABSTRACT

The use of plastics having polar molecular groups for providing isolating coatings on stoppers for injection and infusion bottles, and coated stoppers for injection and infusion bottles.

The use of plastics having polar molecular groups for providing isolating coatings on stoppers for injection and infusion bottles is described.

9 Claims, No Drawings

STOPPERS FOR INJECTION AND INFUSION BOTTLES COATED WITH PLASTICS HAVING POLAR MOLECULAR GROUPS

DESCRIPTION

The stoppers required for closure of injection bottles and infusion bottles containing $\beta$-lactam antibiotics as dry substances, such as cefotaxime, cefodizime, cefpirome or 1[[(6R,7R)-7-[2-(2-amino-4-thiazolyl)-glyoxylamido]- -2-carboxy-8-oxo-5-thia-1-azabicyclo[4.2.-0]oct-2-en-3-yl]- methyl]-5,6,7,8-tetrahydroquinolinium hydroxide, inner salt, $7^2$-(Z)-(O-methyloxime) (also called HOE 111), or their physiologicaly tolerated salts, where appropriate mixed with pH-regulating substances, are ones which are inert towards the product and protect it from damaging environmental effects, there being a particular need for an adequate action to seal against microbial and particulate contamination as well as water and water vapor.

Stoppers for injection and infusion bottles are normally composed essentially of rubber. Although their puncture and reclosure properties are satisfactory, they cause the solutions of the active substances to be deficient in clarity, which is a disadvantage which cannot be tolerated for injection solutions and infusion solutions.

The stoppers currently used for injection and infusion bottles to avoid this disadvantage have their plugs coated with a fluorinated polymer (cf. German Offenlegungsschrift No. 3,346,351, corresponding to Derwent ref. 85-172 215/29). However, the disadvantage of stoppers coated with a fluorinated polymer is that, owing to their rigid coated plugs, the closure of the bottles is less tight than that of uncoated stoppers, and thus there is, in particular, the risk of penetration of moisture. The coating with a fluorinated polymer also has an adverse effect on the puncture and reclosure properties.

Fluorinated polymer film is costly, and stoppers coated with a fluorinated polymer are considerably more costly than uncoated stoppers and, moreover, have serious disadvantages.

To date, no material which is suitable for stoppers for injection bottles and stoppers for infusion bottles for sterile cephalosporin derivatives such as, for example, cefotaxime, cefodizime, cefpirome and HOE 111 and their physiologically tolerated salts, where appropriate mixed with pH-regulating compounds, and which can be used as such, i.e. uncoated, without resulting in cloudy solutions, fragmentation and damaging environmental effects because of a deficient sealant action has yet been described.

It has been found, surprisingly, that stoppers which have coatings composed of plastics having polar molecular groups, such as, for example, cellophane, polyamide, polyester, polyurethane or acetylcellulose, have an adequate sealant action and do not cause solutions of substances which are cephalosporin derivatives to be cloudy. Plastics of this type should be less suitable as coating material, because of the polar groups, than the fluorinated polymer which is currently used and regarded as inert.

Hence the invention relates to the use of plastics having polar molecular groups for coating stoppers for injection and infusion bottles, in particular for $\beta$-lactam antibiotics, and to stoppers coated with plastics having polar molecular groups for injection and infusion bottles, in particular for $\beta$-lactam antibiotics.

Particularly suitable plastics are cellophane (for example ® Cellophane) cellulose acetate, polyamide (for example ®Pla-steril), polyester and polyurethane. Cellophane, polyamide and polyester are particularly preferred. Particularly suitable $\beta$-lactam derivatives are cephalosporins, in particular cefotaxime, cefodizime, cefpirome and HOE 111, and their physiologically tolerated salts, where appropriate mixed with pH-regulating compounds.

Examples of suitable pH-regulating substances are sodium carbonate, trisodium phosphate and basic amino acids.

Either the stoppers are entirely coated with the plastic, or only the plug is coated. The coating or isolation is carried out, for example, by applying a film of plastic having polar molecular groups, preferably only to the plug. However, the coating material can also be applied by spray-coating.

The thickness of the coating can vary. It is merely necessary to ensure an adequate sealant action and an adequate mechanical stability.

It is possible, by coating stoppers or stopper plugs with soft films of plastics having polar molecular groups, to produce stoppers which seal well, are easy to puncture and close again after removal of the needle or of the infusion element, and which do not cause $\beta$-lactam antibiotics as dry substances to give cloudy solutions. Since films composed of the said materials are less costly, stoppers having isolating coatings of plastics having polar molecular groups can be produced at lower cost than those having a coating of a fluorinated polymer.

The sealant action of the stoppers coated entirely or partially according to the invention is very good. If, for example, bottles closed with such stoppers are placed in water, no gain in weight is found. The risk that the crimped seal is not sufficiently tight is extremely slight because the coating material has a certain elasticity compared with the fluorinated polymer.

Stoppers entirely or partially coated with plastics having polar molecular groups withstand sterilization, for example with gaseous formaldehyde, as well as sterilization in an autoclave, which is preferred.

The examples which follow show that a coating or isolation of the stoppers with films composed of the said plastics ensure the clear solutions required for pharmaceuticals, even under various types of stress, whereas a cloudiness of the solutions is perceptible with the naked eye when non-isolated stoppers are used.

Example I

Cefodizime disodium salt with various stoppers for injection bottles:

| Stress | Uncoated stoppers for injection bottles | Stoppers for injection bottles, isolated with polyamide | Stoppers for injection bottles, isolated with cellophane | Stoppers for injection bottles, isolated with polyester |
|---|---|---|---|---|
| rolling for 7 days | cloudy | clear | clear | clear |

-continued

Example I
Cefodizime disodium salt with various stoppers for injection bottles:

| Stress | Uncoated stoppers for injection bottles | Stoppers for injection bottles, isolated with polyamide | Stoppers for injection bottles, isolated with cellophane | Stoppers for injection bottles, isolated with polyester |
|---|---|---|---|---|
| | solution | solution | solution | solution |
| storage upside down for 7 days at room temperature after rolling for 1 h | cloudy solution | clear solution | clear solution | clear solution |
| storage upside down for 7 days at +40° C. after rolling for 1 h | cloudy solution | clear solution | clear solution | clear solution |

Example II
Cefotaxime sodium salt with various stoppers for injection bottles:

| Stress | Uncoated stoppers for injection bottles | Stoppers for injection bottles, isolated with polyamide | Stoppers for injection bottles, isolated with cellophane | Stoppers for injection bottles, isolated with polyester |
|---|---|---|---|---|
| rolling for 7 days | cloudy solution | clear solution | clear solution | clear solution |
| storage upside down for 7 days at room temperature after rolling for 1 h | cloudy solution | clear solution | clear solution | clear solution |
| storage upside down for 7 days at +40° C. after rolling for 1 h | cloudy solution | clear solution | clear solution | clear solution |

Example III
Cefpirome sulfate/sodium carbonate mixture with various stoppers for injection bottles:

| Stress | Uncoated stoppers for injection bottles | Stoppers for injection bottles, isolated with polyamide | Stoppers for injection bottles, isolated with cellophane | Stoppers for injection bottles, isolated with polyester |
|---|---|---|---|---|
| rolling for 7 days | cloudy solution | clear solution | clear solution | clear solution |
| storage upside down for 7 days at room temperature after rolling for 1 h | cloudy solution | clear solution | clear solution | clear solution |
| storage upside down for 7 days at +40° C. after rolling for 1 h | cloudy solution | clear solution | clear solution | clear solution |

I claim:

1. A stopper for an injection or infusion bottle for a β-lactam antibiotic comprising a resilient core provided with an isolating coating of a plastic having polar molecular groups, said plastic being selected from the group consisting of cellophane, cellulose acetate, polyamide, polyester and polyurethane.

2. A stopper for an injection or infusion bottle containing a β-lactam antibiotic, said stopper comprising a core consisting essentially of rubber which is provided with an isolating coating of a plastic having polar molecular groups, said plastic being selected from the group consisting of cellophane, cellulose acetate, polyamide, polyester and polyurethane.

3. A stopper as claimed in claim 2, wherein the injection and infusion bottle contains a cephalosporin derivative.

4. A stopper as claimed in claim 2, wherein the injection or infusion bottle contains at least one β-lactam antibiotic selected from the group consisting of cefotaxime, cefodizime, cefpirome and 1- [[(6R,7R)-7-[2-(2-amino-4-thiazolyl) -glyoxylamido]-2-carboxy- 8-oxo-5-thia-1-azabicyclo [4.2.0]oct-2-en-3yl]-methyl]-5,6,7,8-tetrahydroguinolinium hydroxide, inner salt, $7^2$-(z)-(O-methyloxime) [HOE 111] or their physiologically tolerated salts alone or mixed with a pH-regulating compound.

5. A stopper as claimed in claim 4, wherein the pH regulating compound is selected from the group consisting of sodium carbonate, trisodium phosphate and basic amino acids.

6. A method of making a stopper for an injection or infusion bottle as claimed in claim 2 which comprises providing a stopper consisting essentially of rubber, or its plug, with an isolating coating of a plastic having polar molecular groups, said plastic being selected from the group consisting of cellophane, cellulose acetate, polyamide, polyester and polyurethane.

7. A method for providing an isolating coating on a resilient stopper for an injection or infusion bottle which comprises coating the resilient stopper or its plug with a plastic having polar molecular groups, said plastic being selected from the group consisting of cellophane, cellulose acetate, polyamide, polyester and polyurethane.

8. A method for providing an isolating coating on a resilient stopper for an injection or infusion bottle containing at least one β-lactam antibiotic which comprises coating the resilient stopper or its plug with a plastic having polar molecular groups, said plastic being selected from the group consisting of cellophane, cellulose acetate, polyamide, polyester and polyurethane.

9. A method for providing an isolating coating on a resilient stopper as claimed in claim 8, wherein the resilient stopper consists essentially of rubber.

* * * * *